United States Patent [19]

Pretorius

[11] 4,002,706

[45] Jan. 11, 1977

[54] WAX AND WAX BLENDS

[76] Inventor: Dirk Jacobus Pretorius, 3 Vanderbijl St., Sasolburg 9570, South Africa

[22] Filed: Feb. 20, 1975

[21] Appl. No.: 551,302

Related U.S. Application Data

[63] Continuation of Ser. No. 445,079, Feb. 25, 1974, abandoned.

[52] U.S. Cl. .................................. 264/13; 106/270; 208/21; 260/28.5 D; 44/7.5
[51] Int. Cl.$^2$ .................. B22D 23/08; C08L 91/08
[58] Field of Search .............. 106/270; 208/21, 24, 208/37; 264/7, 12 B; 252/305

[56] References Cited

UNITED STATES PATENTS

| | | | |
|---|---|---|---|
| 2,136,282 | 11/1938 | Dickinson | 106/270 X |
| 3,594,209 | 7/1971 | Kosche et al. | 428/488 |
| 3,804,744 | 4/1974 | Fera | 208/24 |

OTHER PUBLICATIONS

Chem Abstract 70:81:1622.

*Primary Examiner*—Theodore Morris
*Attorney, Agent, or Firm*—Melvin I. Stoltz

[57] ABSTRACT

Wax powders of improved hardness and/or free-flowing properties are produced from blends containing a high content (e.g. 20 – 80%) of soft wax and a harder or higher melting wax component. The molten blend is sprayed and chilled in the form of droplets predominantly between 0.2 and 1 mm in diameter, to solidify rapidly while in suspension. The harder, higher melting components selectively solidify in the outermost region of the particles.

The wax powder so obtained is superior to powders obtained by casting the blend into blocks, followed by milling.

Typical powders are useful for candle extrusion and chipboard manufacture and as internal and external lubricants for plastics, e.g. polyvinylchloride.

30 Claims, No Drawings

WAX AND WAX BLENDS

CROSS REFERENCES TO RELATED APPLICATIONS

This is a continuation in part of Ser. No. 445,079, filed 2-25-74 now abandoned.

BACKGROUND OF THE INVENTION

The present invention relates to a process for producing a particulate wax composition having improved free flowing properties and/or hardness from wax materials having a substantial content of low melting point soft waxes in addition to higher melting point and/or harder waxes.

Normally the incorporation of soft, low melting point waxes in waxes consisting of or comprising a higher melting point and/or harder wax component results in wax powders of which the particles have a reduced hardness and a tendency to become caked together. Such poor free flowing and non-caking properties are undesirable from the point of view of handling the waxes. Yet it may be desirable to incorporate substantial quantities of low melting point soft waxes into powderous wax materials, e.g. wax blends either when it is positively desirable to produce a blend having a lower softening temperature or other characteristics ascribable to the low melting point soft waxes or alternatively, when the low melting point soft wakes or alternatively when the low melting point soft waxes are readily available and are not objectionable from other points of view regarding the intended use of such waxes.

Accordingly it is an object of the invention to provide a process which permits the incorporation of such low melting point soft waxes into wax mixtures or blends, whilst mitigating the adverse effect thereof on the free flowing properties and hardness the powder. Hardness of the powder in the present context is at least in part apparent from the observable tendency of the powder particles to cohere when pressed together.

The present application describes the manufacture of such powders having particle sizes between 3 microns and 3 mm, preferably between 5 and 100 microns. It has now been found that powders of the same compositions are superior if they are predominantly composed of coarser particles normally between 0.10 and 3 mm and in particular between 0.15 and 2 mm, more preferably between 0.2 and 1 mm. In such powders the particles have a much reduced tendency towards cohesion by electrostatic attraction. Yet these powders are commercially perfectly acceptable for the important uses to which these powders can be put.

SUMMARY OF THE INVENTION

The process in accordance with the invention and being as outlined in the introductory paragraph, comprises subjecting droplets essentially between 0.05 and 3 mm in size of the melt of the wax materials of a composition as previously outlined to solidification whilst suspended in a cooling medium, preferably by sudden cooling. More particularly the process comprises:

a. preparing a melt essentially composed of a substantial content of low melting point, and/or soft wax and another wax superior thereto in respect of at least one of the properties: melting point and hardness;

b. converting the melt into droplets, having a size corresponding to the particle size of the particulate wax composition being produced and being essentially between 0.05 and 3 mm in diameter;

c. suspending the droplets in a cooling medium, d. whilst thus suspended, over a period of the order of seconds, causing said droplets to solidify progressively from the outside inwardly by the chilling action of the cooling medium; and e. collecting as said particulate wax composition a free-flowing powdered product consisting of the said droplets in externally solidified form, the wax superior in respect of melting point and/or hardness being concentrated in the outer region of the droplets.

It is then found that the resulting powder has substantially the same softening temperatures as a powder prepared from the same mixture in the conventional method of casting into blocks followed by grinding, but that the particles have increased hardness and improved free flowing, that is improved non-caking properties, whereas the same powders if essentially composed of particles between 5 and 100 microns may have a tendency for their free flowing properties to be impeded by electrostatic attraction between the particles, this effect is substantially reduced or absent if the powders are essentially comprised of powders between 0.1 and 3 mm, more particularly predominantly between 0.15 and 2 mm, preferably predominantly between 0.2 and 1 mm.

The process is preferably carried out in a non-dissolving medium which could be a liquid, e.g. water, but which preferably is a gas, e.g. air. What is aimed at is a shock cooling effect on the molten wax particles which is obtained by allowing the droplets to come into contact with a non-dissolving cooling medium as aforesaid contained in a holder such as a tank, chamber or room. The cooling medium can be stationary or can be introduced in a co-current or counter-current operation.

The invention is applicable to wax mixtures and wax blends in the broadest sense, including hydrocarbon waxes and/or non-hydrocarbon waxes. However, it is particularly applicable to hydrocarbon waxes, more particularly predominantly paraffin waxes and has been applied with success to synthetic waxes produced by a Fischer-Tropsch type of synthesis. In that case the hard wax component of the wax material is usually predominantly straight chain or iso-paraffin or generally paraffins with a low degree of branching. The soft wax component wax, for example, be soft due to its being of lower molecular weight or having a higher branched chain content or being more unsaturated or being of the class known in the art as micro-crystalline waxes (which are believed to consist mainly of double adjoining chains).

The ratio of harder wax to softer components are variable within very wide limits. It does appear that for as long as both components are present in reasonable amounts the process in accordance with the invention will achieve at least some degree of improvement. Of course the extent of improvement will depend on the differences in softening points between the two classes of components and the softening point of the higher melting component. Material improvements were observed with mixes or blends of waxes differing in melting point by anything from a few degrees, say from about 30° C upwards. The congealing temperatures of the low melting component may for example, be from above about 20° C, preferably from about 35° C upwards, usually up to any value less than the congealing temperature of the high melting and/or hard component (i.e. usually not in excess of 80° C), whilst the high melting and/or hard component preferably has a congealing point from about 80° C, preferably 85° C, preferably 90° C upwards.

Congealing point is not the only criterion. Softness (usually determined in terms of penetration) may be the more important criterion, even in cases where both components have a comparatively high congealing temperature, or where both components have similar congealing temperatures.

For example, the hard wax component preferably has a penetration of at the most 10, preferably not more than 5, better still (for some important practical cases) at the most 2, measured at 25° C, $10^{-1}$ mm, and in that case the soft wax may be very soft indeed, having for example, a penetration greater than 200 under the same conditions.

In a major portion of industrially interesting blends to which the invention can be applied, the penetration of the soft component is from about 90 upwards.

The ratios of high melting hard wax component to low melting and/or soft wax component are preferably between about 80 to 20 and 20 to 80, more preferably between 70 to 30 and 30 to 70, say between 60 to 40 and 40 to 60.

In practice wax powders of satisfactory free flowing properties were obtained even with blends having congealing temperatures from 80° C upwards, say from 85° upwards (but not in excess of 95° C), and which, when cast into blocks and then tested, exhibited a penetration at 25° C, $10^{-1}$ mm from about 10 upwards, usually more than 20 and even above 50. This applies for example to powders which are to remain free flowing at 30° C or at least at 25° C.

However, the invention is applicable also to cases where a high degree of freeflowing ability is not essential.

The superior wax component is preferably one which readily solidifies in crystalline form.

The fine droplets which are subsequently to be chilled by shock cooling, may be produced as a spray of molten wax particles by such means as:

a. Pressurized nozzles with or without facilities to introduce air or any atomising gas or liquid into the nozzle or in front of the nozzle at any suitable angle.

b. Rotating discs with or without the introduction of atomising gases or liquids.

c. Supersonic nozzles - nozzles employing high frequency sound waves and sonic nozzles.

d. Conventional prilling equipment,

The increased hardness and/or improved free flowing non-caking properties are imparted to the wax particles during solidification and depend on the speed of cooling and/or size of the droplets formed by the atomising apparatus. The correct conditions could be obtained by adjusting the following variables:

a. particle size of droplets;
b. temperature of cooling medium and wax;
c. flow rate of cooling medium;
d. flow rate of fluid or fluids through the nozzle or nozzles (or equivalent) and temperature.

These variables could assume any value commensurate with achieving the desired properties mentioned above.

The most suitable particle size range is of the order of 150 micrometres to 3 millimetres and a suitable nozzle could even be a conventional adjustable garden hose nozzle connected to a delivery pump for delivering the molten wax to the nozzle under pressure.

Preferably the nozzle or equivalent means is adjusted to convert the melt into droplets of which between 90 and 100% by weight are larger than 100 microns, preferably larger than 150 micron, and up to 3 mm in diameter.

More preferably between 90 and 100% by weight of the droplets produced are between 200 micron and 2 mm in diameter. More than half by weight, preferably between 55 and 90% of the droplets have diameters between 300 micron and 1.5 mm.

If desired or required, the solidified droplets may be subjected to screening. In the preferred final product the following particle sizes prevail:

essentially all between 0.1 to 2 mm, more particularly between 0.15 and 1.5 mm. Of this between 80 and 100% by weight is between 0.2 and 1 mm in diameter, and of this not less than 60% by weight between 0.3 and 0.85 mm.

This method of increasing the hardness and/or improving the free flowing non-caking properties of wax or wax blend particles has a very wide application for making soft waxes into free-flowing powders which would normally have formed lumps or be non-free flowing under the same conditions of application.

Chilling or shock-cooling in the present context means cooling the wax droplets in the time available, i.e., whilst suspended, sufficiently to solidify at least externally so that the droplets, when brought together again, will not stick together. This time can be lengthened by lengthening the distance of travel of the droplets in the cooling medium; in a gaseous cooling medium, e.g. air, the droplets may be sprayed in an upwards direction to lengthen the time of suspension. The minimum contact time required between the suspended droplets and the cooling medium is a function of droplet size distribution and coolant temperature. It is generally more than 1 second, more particularly more than 1½ seconds. In the preferred process the droplets are suspended in the cooling medium for several seconds.

In most commercially important applications the wax melt has a temperature of between 110° C and 160° C, more particularly 130° C to 150° C. Within these limits cold air or nitrogen (to mitigate explosion hazards) at between about 0° to 8° C, more particularly about 5° C (say ± ½° C) is satisfactory. Assuming a suspension time of the droplets of between say 7 and 20 seconds, typically 15 seconds, one would adjust the feed rate of the wax melt so that between 10 and 30 cubic meters, say 16 cubic meters of coolant gas (at say 5° C) are fed into the spray room per kilogram of wax.

These conditions permit adequate cooling of the droplets within the above defined preferred particle size distribution In larger particle sizes the heat transfer is less efficient. This can, if necessary, be compensated for by reducing the feed rate of wax and/or increasing the feed rate of coolant and/or lowering the temperature of wax and/or coolant.

Spraying in an upward direction will serve to lengthen the suspension time.

Optimum spraying conditions for a particulr desired product are most readily determined by simple experiment, guided by the aforesaid principles. As a general rule it is appropriate to adjust the various parameters so that the powder when it settles out from the cooling medium has a temperature of about 25° C.

The improved results in accordance with the invention are due to the harder and or higher melting wax components migrating to the surface of the droplet and there solidifying first, preferably in crysrtalline form, to form, a relatively hard and non-tacky skin, the soft material being concentrated in the core of the particle.

This method enables one to incorporate large quantities of softer and lower melting point waxes into wax blends whilst retaining satisfactory free-flowing non-caking properties of the wax blends used in injection moulding of candles, chipboard manufacture or any application where a free flowing wax powder is required with a relatively low melting point. The manner of using these powders will be readily understood by persons skilled in candle or chipboard manufacture and requires no description.

Soft waxes for the purposes of the present invention include petrolatum, the penetration of which may vary (25° C, $10^{-1}$mm) from about 80 to more than 200. Genuine petrolatum may be used, being a soft wax, typically derived from the dewaxing of petroleum-based cylinder oils, or artificially prepared commercial petrolatum, usually a blend of white oil, ceresin (a mineral wax) and paraffin wax. Powders in accordance with the invention, including petrolatum as the soft wax, are useful for incorporation in plastics, in particular thermoplastics such as polyvinyl-chloride to serve as an internal and external lubricant. The use of lubricants is known per se to plastics manufacturers.

The powders resulting from the process are novel products. These include in particular hydrocarbon wax powders which are free-flowing at 25° C, composed of solidified droplets of a blend of soft and harder waxes, essentially in the particle size range above 0.05 mm, more particularly 0.15 to 3 mm, preferably 0.2 to 2 mm, which powders on remelting, casting into blocks and milling, in the absence of chemical changes, lose their free-flowing properties.

The preferred powders essentially consist of

A. between 20 and 80% by weight of wax having a congealing point between 20° and 80° C and a penetration greater than 90, measured at 25° C, $10^{-1}$ mm; and B. between 80% and 20% by weight of wax having a congealing point from 80° C upwards and a penetration, measured at 25° C, $10^{-1}$ mm of at the most 5, the individual solidified droplets consisting of a hard outer shell, in which component B is relatively concentrated and a core in which component A is relatively concentrated.

The examples which follow are merely illustrative of specific preferred embodiments and should be read in conjunction with the foregoing instructions when it is desired to practice the invention within the full ambit of the appended claims.

DESCRIPTION OF PREFERRED EMBODIMENTS

As a basis for comparative tests use was made of a

Caking test

A 100 g sample of powdered wax is measured into a small plastic bag which is placed in a 500 ml beaker and levelled to form a layer ca 2.5 cm high at the bottom of the beaker. A circular mass piece of a diameter just less than the internal diameter of the beaker (ca 8 cm) and having a mass 1846 g so that the pressure exerted on the powder is equal to 37 m bar, is placed on the wax.

The beaker and sample are then placed in an oven controlled to maintain a temperature of 35° C and left for 24 hours.

At the end of the test period the sample is removed from the oven and allowed to cool to ambient temperature. The plastic bag is removed from the beaker and the powder is rated according to the following scale:

0 no lumps formed
1 very weak, friable lumps formed
2 friable lumps formed
3 cohesive lumps formed
4 strongly cohesive lumps formed
5 one solid, very strongly cohesive lump formed Powders rated at 0 or 1 have been found in practice to be free-flowing when used in common powder metering devices.

EXAMPLE 1

A hard, high melting point hydrocarbon wax (congealing point 96° C min., penetration at 25° C, $10^{-1}$ mm, 2 max) was blended with a soft low melting point hydrocarbon wax (congealing point 36°–42° C, penetration at 25° C, $10^{-1}$ mm, greater than 200)by melting together and mixing thoroughly in a ratio of 60:40. A portion of the blend (congealing point 91° C, penetration at 25° C, $10^{-1}$ mm, 24) was sprayed and cooled to form a powder while the remainder was slabbed, cooled, crushed and milled to a powder (powder B) of similar particle size to that of the sprayed product. For the spraying method a single fluid adjustable spray nozzle was employed having an adjustable central rod in its outlet similar to what is known in certain garden hose nozzles. The nozzle was set to produce droplets about 95% by weight in the size range 150 to 1200 micrometer diameter. The spray was directed upwards. The wax was introduced at a temperature of 145° C. Air at 5° C was employed as a cooling medium, fed into the spray chamber in a downward direction. The air feed rate was 16 m³/kg wax. The solidified droplets, when they reached the bottom of the chamber after about 15 seconds had a temperature of about 25° C.

The powder was screened to remove about 5% of powder outside the limits of 150 to 1200 microns diameter. The balance (Powder A) gave the following screen analysis:

| | | |
|---|---|---|
| + 1180 | micron | 0% by weight |
| − 1180 + 850 | micron | 2.0% by weight |
| − 850 + 600 | micron | 16.8% by weight |
| − 600 + 300 | micron | 63.7% by weight |
| − 300 + 212 | micron | 15.1% by weight |
| − 212 + 150 | micron | 2.3% by weight |
| − 150 | micron | 0.1% by weight |

The powder was very free-flowing with virtually no tendency for the particles to cohere due to electrostatic attraction (a similarly made powder composed of particles between 10 and 50 micron had that tendency. The two powders (A and B) were subjected to the caking test at 35° C for 24 hours and the sprayed product (Powder A) rated at 1, i.e. free-flowing, whereas the milled powder (Powder B) was rated at 2. In powder A the hard wax crystallised preferentially in the outermost zones of the particles, whilst the softer component became enriched in the particle interior.

EXAMPLE 2

A hard, high melting point hydrocarbon wax (congealing point 94.5° C min., penetration at 25° C, $10^{-1}$ mm, 2 max.) was blended in a ratio of 40:60 with the soft low melting point hydrocarbon wax as an example 1. A portion of the blend (congealing point 87° C, penetration at 25° C, $10^{-1}$ mm, 41) was sprayed and cooled as in the previous example to form a powder while the remainder was slabbed, cooled, crushed and milled to a powder of similar particle size to that of the sprayed product. After being subjected to the caking test at 35° C for 24 hours the sprayed sample was rated 1 i.e. free-flowing, whereas the milled product was rated 2, i.e. non-free flowing. The powder in accordance with the invention, composed of particles between 200 and 1500 microns had no appreciable tendency to cohere electrostatically.

EXAMPLE 3

A portion of a blend (congealing point 86° C, penetration at 25° C, $10^{-1}$ mm, 10) of oxygen-containing wax and the high melting point hydrocarbon wax of example 2. was sprayed and cooled to produce a wax powder as in example 1. The remainder of the blend was slabbed, cooled, crushed and milled to a powder of similar particle size to that of the sprayed product.

After being subjected to the caking test at 35° C for 24 hours the sprayed powder was rated at 1, i.e., free-flowing, whereas the milled product was rated at 2.

EXAMPLE 4

The procedure according to examples 1 to 3 is modified as follows. The spray nozzle is replaced by a spinning disc spray device, set to produce droplets between 0.1 and 1 mm in diameter (95% by weight being between 0.2 and 1 mm in diameter). The feed rate of the wax is reduced by half, whilst maintaining the previous feed rate of coolant. The temperature of the coolant air is lowered to 2° C and cold water is atomised into the coolant stream at a rate so adjusted that the water droplets vaporise before reaching the bottom of the chamber.

EXAMPLE 5

A hard, high-melting point hydrocarbon wax, synthesised by Fischer-Tropsch synthesis (congealing point 94.5° C min., penetration at 25° C, $10^{-1}$ mm, not more than 2) was blended with a commercial petralatum (congealing point 75°–80° C, penetration at 25° C, $10^{-1}$ mm 98) by melting together and mixing thoroughly in a ratio of 60:40. A portion of the blend (congealing point 89° C, penetration at 25° C, $10^{-1}$ mm, 37) was sprayed and cooled as in example 1 to form a powder. The remainder was slabbed, cooled, crushed and milled to a powder of comparable particle size to that of the sprayed product. The two powders were subjected to the caking test at 35° C for 24 hours. The sprayed product (particle diameter 0,2 – 1,2 mm) easily passed a rating of 1 (free-flowing). The milled product rated barely at 2 (lumps which were still somewhat friable).

The sprayed powder was suitable as an internal and external lubricant for polyvinylchloride (in a manner readily understood by those skilled in plastics technology).

EXAMPLE 6

The procedure according to example 5 was repeated with the same hard wax and a different, even softer petrolatum (congealing point 25°– 41° C, penetration at 25° C $10^{-1}$ mm, greater than 200). The blend had a congealing point of 91° C (penetration at 25° C, $10^{-1}$ mm 57). The sprayed and the milled powders performed as in the previous example. The sprayed powder remained free-flowing when stored and was used for incorporation polyvinylchloride as an internal and external lubricant.

In the comparative tests on the prior art method of slabcasting and milling every effort was made, using substantial available skills, to produce the best powders possible. In spite of that (and bearing in mind the harsh testing conditions) the improvement achieved by the invention was quite remarkable.

It will be appreciated that, whilst in the aforegoing examples the improvement was generally in the low range of the caking test scale, it would be equally within the spirit of the invention to aim at an improvement in a different range of that scale.

It will also be understood by those skilled in the art that the newly discovered principles on which the invention is based are not limited to the specific waxes exemplified, even though these may be of particular interest.

What has been described in the aforegoing for blends of two waxes is of course applicable also to more complex blends.

What is claimed is:
1. Process for producing a particulate wax composition improved in respect of at least one of the properties: free flowing ability and particle hardness, as compared with conventional blends of the same over-all composition, which comprises:
   a. preparing a melt essentially composed of a substantial content of low melting point, soft wax having a congealing point between about 20° C. and 80° C. and a penetration greater than 80 measured at 25° C., $10^{-1}$ mm, and another wax superior thereto in respect of at least one of the properties: melting point and hardness;
   b. converting the melt into droplets, having a size corresponding to the particle size of the particulate wax composition being produced;
   c. suspending the droplets in a cooling medium;
   d. whilst thus suspended, over a period of between about 7 and 20 seconds, causing said droplets to solidify progressively from the outside inwardly by the chilling action of the cooling medium; and
   e. collecting as said particulate wax composition a free flowing powdered product consisting of the said droplets in externally solidified form, the wax superoir in respect of melting point and/or hardness being concentrated in the outer region of the droplets.

2. Process according to claim 1, wherein step (c) is carried out in a non-dissolving shock cooling medium.

3. Process according to claim 2, wherein the medium comprises a liquid.

4. Process according to claim 2, wherein the medium is gas.

5. Process according to claim 1, wherein said waxes are essentially hydrocarbon waxes.

6. Process according to claim 5, wherein said waxes are predominantly paraffin waxes.

7. Process according to claim 5, wherein the waxes are predominantly waxes produced by Fischer-Tropsch synthesis.

8. Process according to claim 5, wherein the low melting point, soft wax is an oxygenated hydrocarbon wax or petrolatum.

9. Process according to claim 1, wherein said melt is prepared from said low melting point, soft wax and said another wax having a melting point at least 30° C. higher than the low melting point, soft wax.

10. Process according to claim 1, wherein the congealing temperature of the low melting soft wax is from 30° C. upwards and the other wax has a congealing point at least as high as 80° C.

11. Process according to claim 1, wherein said another wax is a hard wax having a penetration of at the most 10, measured at 25° C., $10^{-1}$ mm.

12. Process according to claim 11, wherein the hard wax component has a penetration of at the most 5 and the soft wax has a penetration from about 80 upwards, both measured at 25° C $10^{-1}$ mm.

13. Process according to claim 1, wherein the ratio of the low melting point, soft wax to said another wax is between 80:20 and 20:80 by weight.

14. Process according to claim 13, wherein said ratio is between 70 to 30 and 30 to 70 by weight.

15. Process according to claim 1 applied to blends having congealing temperature from 80° C. upwards and which, when cast into blocks and then tested, exhibit a penetration at 25° C., $10^{-1}$ mm of at least 10 and which if then milled into a powder is non-free flowing.

16. Process according to claim 15 carried out with a blend having a congealing point between 80° and 95° C., wherein the ratio of the low melting point, soft wax to said another wax is between 70:30 and 30:70 by weight, the soft component having a penetration of 25° C., $10^{-1}$ mm in excess of 90 and a congealing point of above 20 and below 80° C. and wherein the droplets are produced in a particle size range of between 3 micrometers and 3 millimeters.

17. Process according to claim 15 carried out with a blend having a congealing point between 80° and 95° C, wherein the ratio of the low melting point soft wax to said another wax is betwen 70:30 by weight, the soft component having a penetration at 25° C, $10^{-1}$ mm in excess of 90 and a congealing point of above 20° and below 80° C and wherein the droplets are produced in a particle size range comprising between 90 and 100% by weight particles between 150 micrometers and 3 millimeters.

18. The process defined in claim 1, wherein the melt is converted into droplets having a diameter between about 0.05 and 3 mm.

19. Process according to claim 4 wherein between 90 and 100% by weight of the droplets produced are between 200 micron and 2 mm in diameter.

20. Process according to claim 19 wherein more than half by weight of the droplet produced has diameters between 300 micron and 1.5 mm.

21. Process according to claim 4 wherein the solidified droplets are subjected to screening, a powder being recovered composed of particles essentially all between 0.1 and 2mm in diameter.

22. Process according to claim 18, wherein between 90 and 100% by weight of said droplets are larger than 100 microns.

23. Free flowing particulate wax compositions whenever produced by a process as claimed in claim 1.

24. A hydrocarbon wax powder which is free flowing 25° C. composed of solidified droplets of a blend essentially consisting of
 a. between 20% and 80% by weight of wax having a congealing point between 20 and 80° C. and a penetration greater than 90, measured at 25° C., $10^{-1}$ mm; and
 b. between 80% and 20% by weight of wax having a congealing point from 80° C. upwards and a penetration, measured at 25° C., $10^{-1}$ mm of at the most 5, the overall composition of each entire solidified droplet being substantially identical to that of the blend, the Components (a) and (b) in the soidified droplet being heterogeneously redistributed so that each solidified droplet consists of a hard outer shell, wherein component (a) is enriched relative to said overall composition and a softer core in which component (b) is enriched relative to said overall composition.

25. The hydrocarbon wax powder defined in claim 24, wherein said powder is further defined as free flowing at 25° C., composed of solidified droplets of a blend of soft and harder waxes and which on melting, casting into blocks and milling, in the absence of chemical changes, loses its free flowing properties.

26. A hydrocarbon wax according to claim 24 composed of wax particles having a predominantly hard, non-tacky outer zone and a relatively softer or more tacky core, essentially all particles being between 0,1 and 2 mm in diameter of which between 80 and 100% by weight are between 0,2 and 1 mm in diameter, not less than 60% by weight of the latter being between 0,3 and 0,85 mm in diameter.

27. In the well-known process for manufacturing chip board using wax blends, the improvement comprising the step of incorporating the hydrocarbon wax powder defined in claim 25 as a component of said wax blends.

28. In the well-known process for manufacturing injection moulded candles from wax blends, the improvement comprising the step of incorporating the hydrocarbon wax powder defined in claim 25 as a component of said wax blends.

29. A hydrocarbon wax powder as defined in claim 24, wherein the said soft wax component defined as component (b), comprises petrolatum, and the hard wax is concentrated in a hard outer shell of the particles whilst the petrolatum forms a soft core of the particles.

30. A process for manufacturing plastic comprising the step of mixing the hydrocarbon wax powder defined in claim 25 into the plastic component mix as an internal/external lubricant.

* * * * *